US012072147B1

(12) United States Patent
Vankleef

(10) Patent No.: US 12,072,147 B1
(45) Date of Patent: Aug. 27, 2024

(54) APPARATUS FOR BARREL TOASTING PROCESS

(71) Applicant: Bohnert Equipment Company, Inc., Louisville, KY (US)

(72) Inventor: Ericus Vankleef, Louisville, KY (US)

( * ) Notice: Subject to any disclaimer, the term of this patent is extended or adjusted under 35 U.S.C. 154(b) by 920 days.

(21) Appl. No.: 16/869,025

(22) Filed: May 7, 2020

Related U.S. Application Data

(60) Provisional application No. 62/844,530, filed on May 7, 2019.

(51) Int. Cl.
*F26B 3/30* (2006.01)
*F26B 11/04* (2006.01)

(52) U.S. Cl.
CPC ................ *F26B 3/30* (2013.01); *F26B 11/04* (2013.01); *F26B 2210/16* (2013.01)

(58) Field of Classification Search
CPC ......... F26B 3/30; F26B 11/04; F26B 2210/16
USPC ........................................................... 34/264
See application file for complete search history.

(56) References Cited

U.S. PATENT DOCUMENTS 2,185,206 A * 1/1940 Little ....................... B27M 1/06 219/240
2,202,082 A * 5/1940 Berkstresser ........ B23D 47/047 144/154
2,507,685 A * 5/1950 Wilde ...................... C12G 3/07 219/200
3,842,723 A * 10/1974 Boucher .................. B65D 9/04 99/277.1
4,827,994 A * 5/1989 Whitford .................. B27C 5/00 144/115
5,271,161 A * 12/1993 Brinck, II ................ C12H 1/22 34/105

(Continued)

FOREIGN PATENT DOCUMENTS

EP 1954490 B1 * 1/2014 ............ B44B 5/028
JP 5361389 B2 * 12/2013 ............ B44B 5/028

(Continued)

OTHER PUBLICATIONS

Popular Science; Infrared Radiation Can Fine-Tune the Taste of Whiskey, May 13, 2016.

(Continued)

*Primary Examiner* — Stephen M Gravini
(74) *Attorney, Agent, or Firm* — Gary K. Price

(57) ABSTRACT

An apparatus and method of using same for toasting wooden barrels may increase efficiency and throughput of barrel toasting. Such an apparatus may include a carousel rotatable about an axis of rotation between a plurality of positions and including a plurality of barrel heating stations arranged about the axis of rotation. Each barrel heating station including a barrel support and an infrared heater configured to heat an inner surface of the wooden barrel supported by the respective barrel support. When in a first position of the carousel, a first barrel heating station is positioned to have a first barrel loaded thereon, and when in a second position of the carousel the first barrel heating station is positioned to have the first barrel removed therefrom. The first barrel is toasted by the infrared heater of the first barrel heating station as the carousel rotates from the first position to the second position.

20 Claims, 8 Drawing Sheets

(56) References Cited

U.S. PATENT DOCUMENTS

| | | | | | |
|---|---|---|---|---|---|
| 5,331,133 | A * | 7/1994 | Cordier | B27H 5/08 219/523 |
| 5,630,265 | A | 5/1997 | Stone | |
| 5,729,914 | A * | 3/1998 | Aloisi | B31F 1/0038 34/105 |
| 7,771,146 | B2 * | 8/2010 | Waterman | B08B 9/0808 409/201 |
| 7,954,525 | B2 * | 6/2011 | Waterman | B27H 5/08 147/13 |
| 8,168,104 | B2 * | 5/2012 | Han | B44B 5/0009 264/210.2 |
| 9,459,045 | B2 * | 10/2016 | Priero | F26B 21/004 |
| 9,919,448 | B2 * | 3/2018 | van Kleef | B27M 1/08 |
| 10,132,564 | B1 * | 11/2018 | Romanek | F26B 3/04 |
| 10,357,895 | B2 * | 7/2019 | Van Kleef | B27H 5/10 |
| 11,008,176 | B1 * | 5/2021 | Van Kleef | B65G 39/07 |
| 11,084,182 | B1 * | 8/2021 | Vankleef | B27H 5/12 |
| 2009/0136885 | A1 * | 5/2009 | Manno | B27H 5/08 432/37 |
| 2009/0188588 | A1 * | 7/2009 | Whiting | B27H 5/08 147/1 |
| 2010/0124725 | A1 | 5/2010 | Waterman | |
| 2011/0203093 | A1 * | 8/2011 | Dollinger | B27H 5/08 29/402.06 |
| 2013/0213524 | A1 * | 8/2013 | Waterman | B27H 5/08 147/1 |
| 2021/0102148 | A1 * | 4/2021 | Fearnside | C12H 1/16 |
| 2021/0157312 | A1 * | 5/2021 | Celia | G05B 13/028 |

FOREIGN PATENT DOCUMENTS

| | | | | |
|---|---|---|---|---|
| KR | 20070055799 | A * | 5/2007 | B44C 1/24 |
| WO | WO-2007061193 | A1 * | 5/2007 | B44C 1/24 |
| WO | WO-2011103335 | A1 * | 8/2011 | B27H 5/08 |
| WO | WO-2016168824 | A1 * | 10/2016 | B27H 5/10 |

OTHER PUBLICATIONS

U.S. Appl. No. 62/844,530 titled “Apparatus for Barrel Toasting Process” filed May 7, 2019.

* cited by examiner

APPARATUS FOR BARREL TOASTING PROCESS

BACKGROUND

Toasting is performed during the production and/or reconditioning of wooden barrels used for aging some types of distilled spirits, e.g., bourbons and other whiskies, as well as some wines. Toasting conditions the inner surface of a barrel to release sugars and other compounds so that the barrel may impart a desired flavor to the liquid aged in the barrel. Traditionally, the barrel toasting process has involved manually placing a wooden barrel over a heat source (e.g. a flame) and manually rotating the barrel until a cooper determines the toasting to be complete. This process of using an open flame results in safety concerns for workers within a cooperage. Furthermore, during this process, the cooper may control the temperature of the heat source, the humidity, the climate within the cooperage, etc. As such, the toasting process may be performed on a limited number of barrels at a time. There exists a need for a process that allows for a higher barrel throughput.

SUMMARY

The invention addresses these and other problems associated with the art by providing an apparatus for toasting a wooden a barrel that may enhance the efficiency and/or throughput, in some instances by allowing multiple barrels to be toasted in unison.

Therefore, consistent with one aspect of the invention, an apparatus for heating wooden barrels may include: a barrel support to support the wooden barrel; a drive for rotating the barrel support; an infrared heater including a plurality of infrared heating elements; and a heater support configured to move the infrared heater between a first position and a second position, where when in the first position the infrared heater is external to the wooden barrel, and when in the second position at least a portion of the infrared heater is positioned within the wooden barrel to heat an inner surface of the wooden barrel, and where rotation of the barrel support by the drive when the infrared heater is in the second position rotates the wooden barrel about the infrared heater.

In some embodiments, the plurality of infrared heating elements includes a first heating element, a second heating element, and a third heating element, each of which form a first side, a second side, and a third side respectively of a substantially triangular prism shape. In some such embodiments, the substantially triangular prism shape includes an open top and an open bottom for internal ventilation. In other such embodiments, the heater support additionally includes a cover sized and configured to cover an open end of the wooden barrel when the infrared heater is in the second position, where the cover includes an opening to release heat.

In some embodiments, the heating apparatus is a first heating apparatus of a plurality of heating apparatuses, where the plurality of heating apparatuses are arranged around a carousel. In other embodiments, the heating apparatus is a first heating apparatus of a plurality of heating apparatuses, where the first heating apparatus, a second heating apparatus, and a third heating apparatus of the plurality of heating apparatuses are arranged on a barrel trolley.

In some embodiments, the barrel support supports the wooden barrel in an upright position, the wooden barrel having an open top; and where the heater support moves the infrared heater vertically and linearly such that in the first position the infrared heater is located above the barrel and movement of the infrared heater from the first position to the second position projects the infrared heater through the open top of the wooden barrel. In some such embodiments, the heater support includes a solenoid-actuated locking pin to hold the infrared heater in the first position.

In another aspect, an apparatus for toasting a plurality of wooden barrels, includes: a carousel rotatable about an axis of rotation between a plurality of positions and including a plurality of barrel heating stations arranged about the axis of rotation, each barrel heating station including a barrel support and an infrared heater configured to heat an inner surface of a wooden barrel supported by the respective barrel support; where when in a first position of the plurality of positions of the carousel, a first barrel heating station among the plurality of barrel heating stations is positioned to have a first barrel loaded thereon; where when in a second position of the plurality of positions of the carousel, the first barrel heating station is positioned to have the first barrel removed therefrom; and where the first barrel is toasted by the infrared heater of the first barrel heating station as the carousel is rotated from the first position to the second position.

In some embodiments, the first position and the second position are the same position, whereby barrel loading and unloading are performed at a barrel loading/unloading station disposed at a first fixed location adjacent the carousel. In other embodiments, the first position and the second position are different positions, whereby barrel loading is performed at a barrel loading station disposed at a first fixed location adjacent the carousel and barrel unloading is performed at a barrel unloading station disposed at a second fixed location adjacent the carousel.

In some embodiments, the apparatus additionally includes a carousel drive configured to rotate the carousel about the axis of rotation, where the carousel drive is configured to pause rotation of the carousel for a predefined period of time at each of the plurality of positions. In other instances, the apparatus additionally includes a carousel drive configured to continuously rotate the carousel about the axis of rotation from the first position to the second position.

In some embodiments, when the carousel is in the second position, a second barrel heating station among the plurality of barrel heating stations is positioned to have a second barrel loaded thereon.

In some embodiments, the carousel additionally includes a gangway disposed between a pair of barrel heating stations among the plurality of barrel heating stations.

In some embodiments, the carousel additionally includes: a central hub configured to rotatably support at least a portion of the carousel to facilitate rotation of the carousel about the axis of rotation; an internal platform positioned in a center area circumscribed by the plurality of barrel heating stations, where the internal platform rotates with the carousel; and a central control panel positioned on the rotating platform for powering the plurality of barrel heating stations. In some such embodiments, the apparatus may additionally include a main control panel positioned at a fixed location adjacent the carousel, where the central hub includes a plurality of slip rings configured to convey electrical power from the main control panel to the central control panel.

In some embodiments, the carousel additionally includes a plurality of barrel trolleys, each of which includes: a respective set of heating stations among the plurality of barrel heating stations; a drive mechanically coupled to the respective set of heating stations for rotating the respective barrel supports thereof during heating with the respective infrared heaters; and a plurality of wheels configured to support the respective set of heating stations. In some such embodiments, the carousel includes a fixed track disposed underneath the carousel, where the plurality of wheels of each barrel trolley are configured to roll along the fixed track during rotation of the carousel.

In other such embodiments, each of the plurality of barrel trolleys additionally includes an overhead frame to support a respective heater support for the respective infrared heater of each heating station among the respective set of heating stations, where each respective heater support is configured to move the respective infrared heater between a first position and a second position, where when in the first position the respective infrared heater is external to a respective wooden barrel supported by the respective heating station, and when in the second position at least a portion of the respective infrared heater is positioned within the respective wooden barrel to heat an inner surface of the respective wooden barrel.

In some embodiments, the first barrel heating station is configured to rotate the barrel support thereof while heating the inner surface of the first barrel such that the first barrel is rotated about the infrared heater of the first barrel heating station. In other embodiments, the first barrel heating station is additionally configured to move the infrared heater of the first barrel heating station between a first position where the infrared heater of the first barrel heating station is external to the first barrel and a second position where at least a portion of the infrared heater of the first barrel heating station is positioned within the first barrel.

In some embodiments, the infrared heater of the first barrel heating station includes a plurality of infrared heating elements. In some such embodiments, the plurality of infrared heating elements includes a first heating element, a second heating element, and a third heating element, each of which form a first side, a second side, and a third side respectively of a substantially triangular prism shape. In some embodiments, the substantially triangular prism shape includes an open top and an open bottom for internal ventilation.

In other embodiments, the first barrel heating station additionally includes a heater support to support the infrared heater, the heater support additionally including a cover sized and configured to cover an open end of the first barrel when the infrared heater of the first barrel heating station is in a heating positon, such that at least a portion of the infrared heater of the first barrel heating station is positioned within the first barrel to heat an inner surface of the first barrel, where the cover includes an opening to release heat.

In some embodiments, the barrel support of the first barrel heating station supports the first barrel in an upright position, the first barrel having an open top; and where the first barrel heating station includes a heater support that moves the infrared heater of the first barrel heating station vertically and linearly such that in a storage position the infrared heater of the first barrel heating station is located above the first barrel and movement of the infrared heater of the first barrel heating station from the storage position to a heating position projects the infrared heater of the first barrel heating station through the open top of the first barrel. In some such embodiments, the heater support of the first barrel heating station includes a solenoid-actuated locking pin to hold the infrared heater of the first barrel heating station in the storage position.

In yet another aspect, a method of toasting a wooden barrel includes: rotating a carousel about an axis of rotation between a plurality of positions, the carousel including a plurality of barrel heating stations arranged about the axis of rotation, each barrel heating station including a barrel support and an infrared heater configured to heat an inner surface of a wooden barrel supported by the respective barrel support; loading, at a first position of the plurality of positions of the carousel, a first barrel onto a first barrel heating station among the plurality of barrel heating stations; unloading, at a second position of the plurality of positions of the carousel, the first barrel from the first barrel heating station; and toasting, by the infrared heater of the first barrel heating station, the first barrel as the carousel is rotated from the first position to the second position.

In some embodiments, the first position and the second position are the same position, whereby loading and unloading are performed at a barrel loading/unloading station disposed at a first fixed location adjacent the carousel. In other embodiments, the first position and the second position are different positions, whereby loading is performed at a barrel loading station disposed at a first fixed location adjacent the carousel and unloading is performed at a barrel unloading station disposed at a second fixed location adjacent the carousel. In still other embodiments, when the carousel is in the second position, loading a second barrel onto a second barrel heating station among the plurality of barrel heating stations using the barrel loading station.

In some embodiments, the barrel support of the first barrel heating station supports the first barrel in an upright position, the first barrel having an open top; the method additionally includes: moving the infrared heater of the first barrel heating station from a first position where the infrared heater of the first barrel heating station is external to the first barrel to a second position where at least a portion of the infrared heater of the first barrel heating station is positioned within the first barrel by moving the infrared heater of the first barrel heating station vertically and linearly such that in the first position the infrared heater of the first barrel heating station is located above the first barrel and movement of the infrared heater of the first barrel heating station from the first position to the second position projects the infrared heater of the first barrel heating station through the open top of the first barrel. In other embodiments, the method additionally includes rotating the barrel support of the first barrel heating station while heating the inner surface of the first barrel with the infrared heater of the first barrel heating station such that the first barrel supported by the barrel support of the first barrel heating station is rotated about the infrared heater of the first barrel heating station. In still other embodiments, the method additionally includes moving the infrared heater of the first barrel heating station between a first position where the infrared heater of the first barrel heating station is external to the first barrel and a second position where at least a portion of the infrared heater of the first barrel heating station is positioned within the first barrel.

In still yet another aspect, another method for toasting a wooden barrel includes: supporting the wooden barrel on a rotatable barrel support; moving an infrared heater from a first position where the infrared heater is external to the wooden barrel to a second position where at least a portion of the infrared heater is positioned within the wooden barrel; and heating the inner surface of the wooden barrel with the infrared heater while the infrared heater is in the second position and while rotating the rotatable barrel support such that the wooden barrel rotates about the infrared heater during heating.

In some embodiments, the barrel support supports the wooden barrel in an upright position, the wooden barrel having an open top; and where moving the infrared heater from the first position to the second position includes moving the infrared heater vertically and linearly such that in the first position the infrared heater is located above the barrel and movement of the infrared heater from the first position to the second position projects the infrared heater through the open top of the wooden barrel. In other embodiments, the method additionally includes after heating the inner surface of the wooden barrel with the infrared heater lifting the infrared heater from the second position to the first position such that the infrared heater is held in the first position by a solenoid-actuated locking pin. In some such embodiments, the method additionally includes actuating the solenoid-actuated locking pin to release the infrared heater prior to moving the infrared heater from the first position to the second position.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 1A illustrates the infrared heater of the heating apparatus in a second (heating) position;

FIG. 1B illustrates the infrared heater of the heating apparatus in a first (storage) position.

FIG. 2A illustrates the infrared heater of the heating apparatus in a second (heating) position; FIG. 2B illustrates the infrared heater of the heating apparatus in a first (storage) position.

FIG. 6A illustrates the barrel trolley without barrels loaded thereon; FIG. 6B illustrates the barrel trolley with barrels loaded thereon.

DETAILED DESCRIPTION

Embodiments consistent with the invention are generally directed to various aspects of heating apparatus for use in a barrel toasting process. Barrels toasted using the various apparatuses and processes described herein may include, for example, various types of wooden barrels used for aging and/or storing beverages such as whiskey, bourbon, wine, etc. However, it will be appreciated that the herein-described processes may be used in the toasting of other types of wooden barrels, so the invention is not limited to any particular use, size or type of wooden barrel.

Figure 1B:
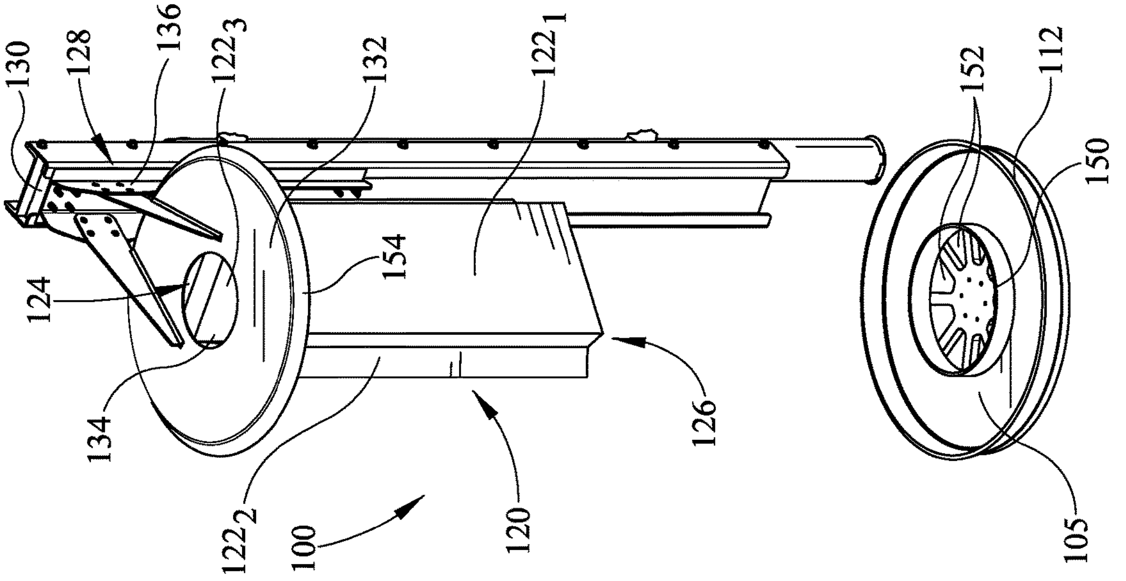
FIGS. 1A-B illustrate perspective views of a heating apparatus for toasting a wooden barrel consistent with some embodiments of the invention.
Figure 1A:
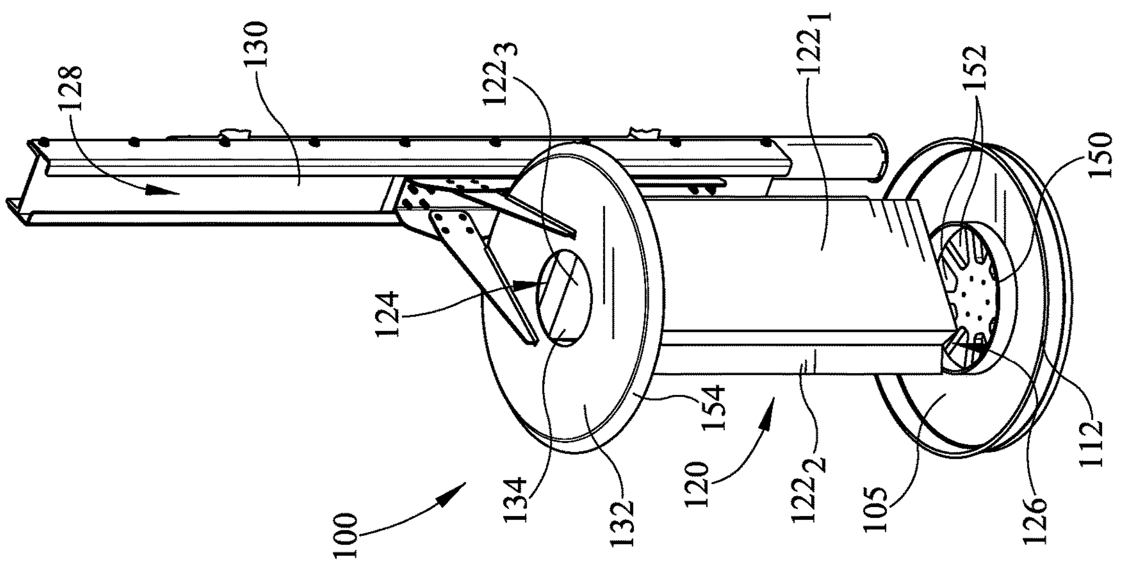
Figure 2B:
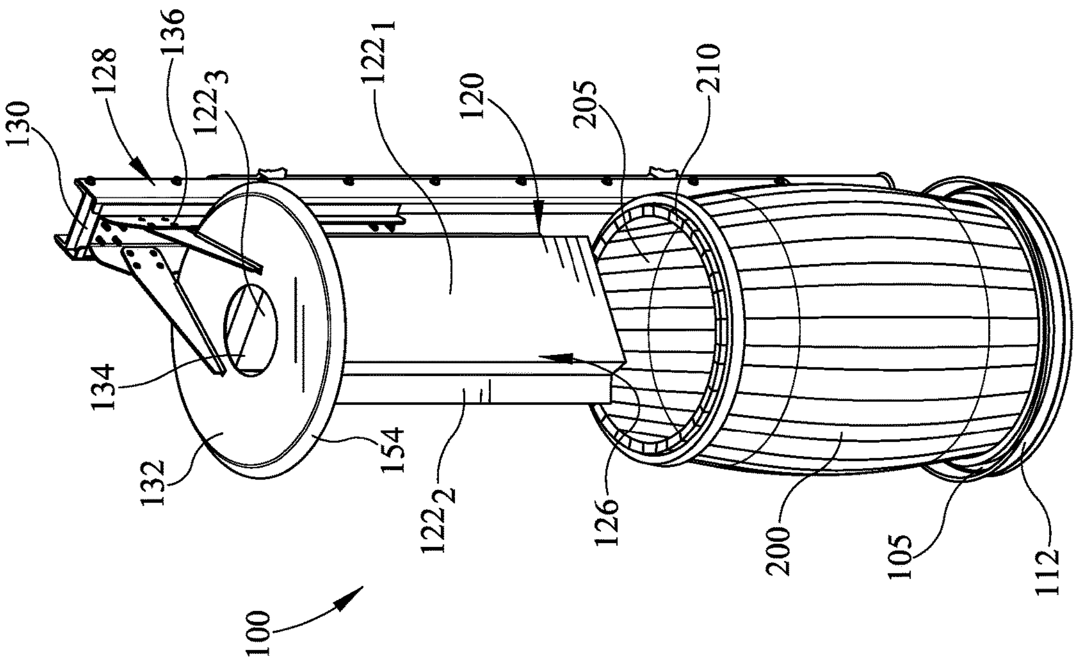
FIGS. 2A-B illustrate perspective view of the heating apparatus of FIGS. 1A-B respectively with a wooden barrel loaded thereon.
Figure 2A:
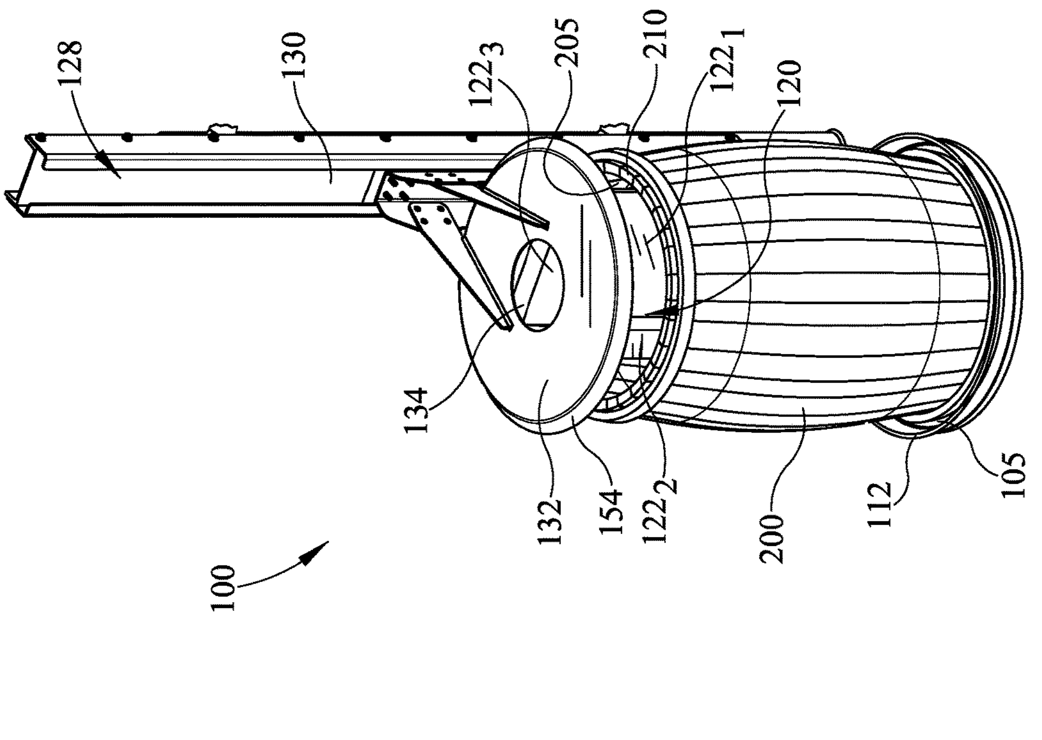

Turning now to the drawings, wherein like numbers denote like parts throughout the several views, FIGS. 1A-1B and 2A-2B, illustrate perspective views of a heating apparatus 100 for toasting a wooden barrel 200 with an infrared heater 120 in multiple positions without a barrel loaded thereon (FIGS. 1A-1B) and with a barrel 200 loaded thereon (FIGS. 2A-2B). The heating apparatus 100 may include a barrel support 105 configured to support the wooden barrel during the toasting process. In some instances, the barrel support may additionally include a lip 112 for additional support to the barrel 200. In other instances, the barrel support 105 may include a groove or indention for receiving and stabilizing the barrel 200. In still other instances, the barrel support 105 may be flat. The barrel support 105 illustrated in FIGS. 1A-1B and 2A-2B supports a barrel 200 in an upright position, and as such, the barrel support 105 may be substantially circular to mimic the base of the barrel sat thereon. However, this is not intended to be limiting, as the barrel support 105 may be any other shape (e.g. rectangular, square, etc.). Furthermore, in some instances, the barrel support 105 may support the barrel in a horizontal or angled position. In such instances, the barrel support may be rectangular, square, or any other shape capable of supporting a barrel in a horizontal or angled position.

The heating apparatus 100 may include an infrared heater 120 for toasting the barrel 200. Infrared heating, unlike conventional toasting with a flame, utilizes electromagnetic radiation to transmit infrared waves for heating. Infrared heating may heat a surface without directly contacting the surface to be heated, in this instance the interior of a wooden barrel 205. The infrared heater 120 may be capable of heating the barrel 200 to temperatures around 500 degrees Fahrenheit. In some instances, the infrared heater 120 may include a plurality of infrared heating elements $\mathbf{122}_{1\text{-}n}$, which in some instances, may be desirable to achieve a more even toast. For example, such as illustrated in FIGS. 1A-1B and 2A-2B, the infrared heater 120 may include three infrared heating elements $\mathbf{122}_{1\text{-}3}$ arranged to form a substantially triangular prism shape, which may allow for thorough and even toasting of the barrel 200 as the barrel 200 rotates (described herein). In another example, the infrared heater 120 may include four infrared heating elements 122 arranged to form a substantially rectangular prism shape. However, these examples are not intended to be limiting, as any arrangement of infrared heating elements $\mathbf{122}_{1\text{-}n}$ capable of toasting the barrel 200 may be used.

In some instances, the infrared heater 120 may be stationary and the barrel may move into a heating position. In other instances, it may desirable to move the infrared heater 120 from a first position that is exterior to the barrel 200 (e.g. a storage position) to a second position where at least a portion of the infrared heater 120 is internal to the barrel 200 (e.g. a heating position). In the embodiment illustrated in FIGS. 1A-1B and 2A-2B, this movement of the infrared heater 120 may be achieved through the use of a heater support 128, which connects (either directly or indirectly) to the infrared heater 120. In some instances, the heater support 128 may include a railing 130, guide, track, or the like for facilitating the movement of the infrared heater 120 from the storage position (FIGS. 1B and 2B) to heating position (FIGS. 1A and 2A). In instances where the barrel 200 is in an upright position, the heater support 128 may move the infrared heater 120 heater vertically and linearly such that when in the storage position, where the infrared heater 120 is external to the barrel 200, the infrared heater 120 is located above the barrel 200 (FIGS. 1B and 2B). The heater support 128 may, in some instances, include a locking pin, hook, latch, bolt, clamp, or the like to hold the infrared heater in a designated position. In some instances, such as illustrated in FIGS. 1A-1B and 2A-2B, the infrared heater 120 may be biased to a heating position, where the heater is at least partially within the interior of the barrel 205. In such instances, the heater support 128 may include a solenoid-actuated locking pin 136 to hold the infrared heater 120 in the first position exterior to the barrel 200. However, in some instances, the infrared heater 120 may be biased to a storage position and locking pin, hook, latch, bolt, clamp, or the like may be used to hold the infrared heater in place when in a heating position. A rotational or linear drive (not shown in FIGS. 1A-1B and 2A-2B) may be used in some embodiments to move the infrared heater between storage and heating positions, and while in some embodiments a dedicated drive may be used for heating apparatus 100, in other embodiments, e.g., apparatus 300 of FIGS. 3-5, a common drive may be used by multiple heating apparatuses 100 depending upon which heating apparatus is disposed in a loading and/or unloading position.

In addition, in some embodiments, a pneumatic or hydraulic cylinder may be utilized by a heater support 128 such that the infrared heater 120 may be moved via gravity from the storage position to the heating position simply by releasing a latch, pin or other mechanism holding the infrared heater in the storage position, with the pneumatic or hydraulic cylinder controlling the rate at which the infrared heater is dropped into the barrel. In such embodiments, a drive may be used to lift the infrared heater from the heating position to the storage position when toasting is complete, and the latch, pin or other mechanism may be engaged once in the storage position such that the infrared heater is held in the storage position until a new barrel has been placed in the heating apparatus.

In order to achieve an effective toast of the barrel, in some instances, the area between the heating elements and the interior of the barrel is closed off from exterior air. For example, the infrared heating elements $\mathbf{122}_{1\text{-}n}$ may be arranged in such a way that they form a substantially geometric shape (e.g. a triangular prism), where the sides directly contact each other, so that is not open space between each of the infrared heating elements $\mathbf{122}_{1\text{-}n}$. However, in some instances, it may be desirable to allow for a draft passage or airflow through the center of the infrared heating elements. This may be achieved by, for example as illustrated in FIGS. 1A-1B and 2A-2B, the heating elements $\mathbf{122}_{1\text{-}3}$ including an open top 124 and open bottom 126 to allow for air to freely flow through the center of the infrared heater 120. In some instances, the draft passage or airflow through the center of the infrared heating elements 120 may be further facilitated by the structure of the barrel support 105. The barrel support, may in some instances, additionally include an interior lip 150 that the infrared heating elements 122 envelope when disposed within the barrel 200. Additionally, within the inner lip 150 may have one or more openings 152 through the barrel support 105. These one or more openings 152 allow for air to flow from underneath the barrel support 105 and through the center of the infrared heater 120, and out the open top 124 of the infrared heater 120. In some additional instances, the heater support 128 may include a cover 132 that is configured to cover the open end 210 of the wooden barrel 200 when at least a portion of the infrared heater 120 is internal to the barrel 200. Such a cover 132 may, as illustrated in FIGS. 1A-1B and 2A-2B, be circular, so as to mimic the size and shape of the open end 210 of the barrel 200; however, this is not intended to be limiting, as the cover 132 may be any size and shape capable of covering the open end 210 of the barrel 200. The cover 132 may, in some instances, further include an opening 134 for releasing heat and providing additional airflow through the center of the infrared heating element 120. In some instances, the opening 324 may be adjustable in diameter. This adjustability may, in some instances, allow the opening 324 to exceed the width of the center of the infrared heater 120 and allow for a small amount of heat to escape, which may be desirable during some toasting parameters. In other instances, the cover 132 may also include a lip 154 extending over the open end 210 of the wooden barrel 200 to further facilitate containment of heat within the barrel.

In order to achieve a uniform toast throughout the entire interior 205 of the barrel, it may be desirable, in some instances, to rotate the barrel support 105 thus rotating the barrel 200 sat thereon. Such rotation may result in the barrel 200 being rotated around a stationary infrared heater 120 when at least a portion of the infrared heater 120 is internal to the barrel 200. A drive 140, for example a motor, gear, or the like, may be used to facilitate the rotation of the barrel support 110. In some instances, a single drive 140 may facilitate the rotation of a single barrel support 110, and in such instances, the drive 140 may be disposed underneath the barrel support 110 (not illustrated). In other instances, a single drive 140 may be used to facilitate the rotation of the barrel supports 110 of multiple heating apparatuses 100. In other embodiments, the barrel may remain stationary and the infrared heater 120 may rotate within the barrel 200. However, in other instances, if a circular heating element were available the need to rotate the barrel for a uniform toast may be eliminated.

Figure 3:
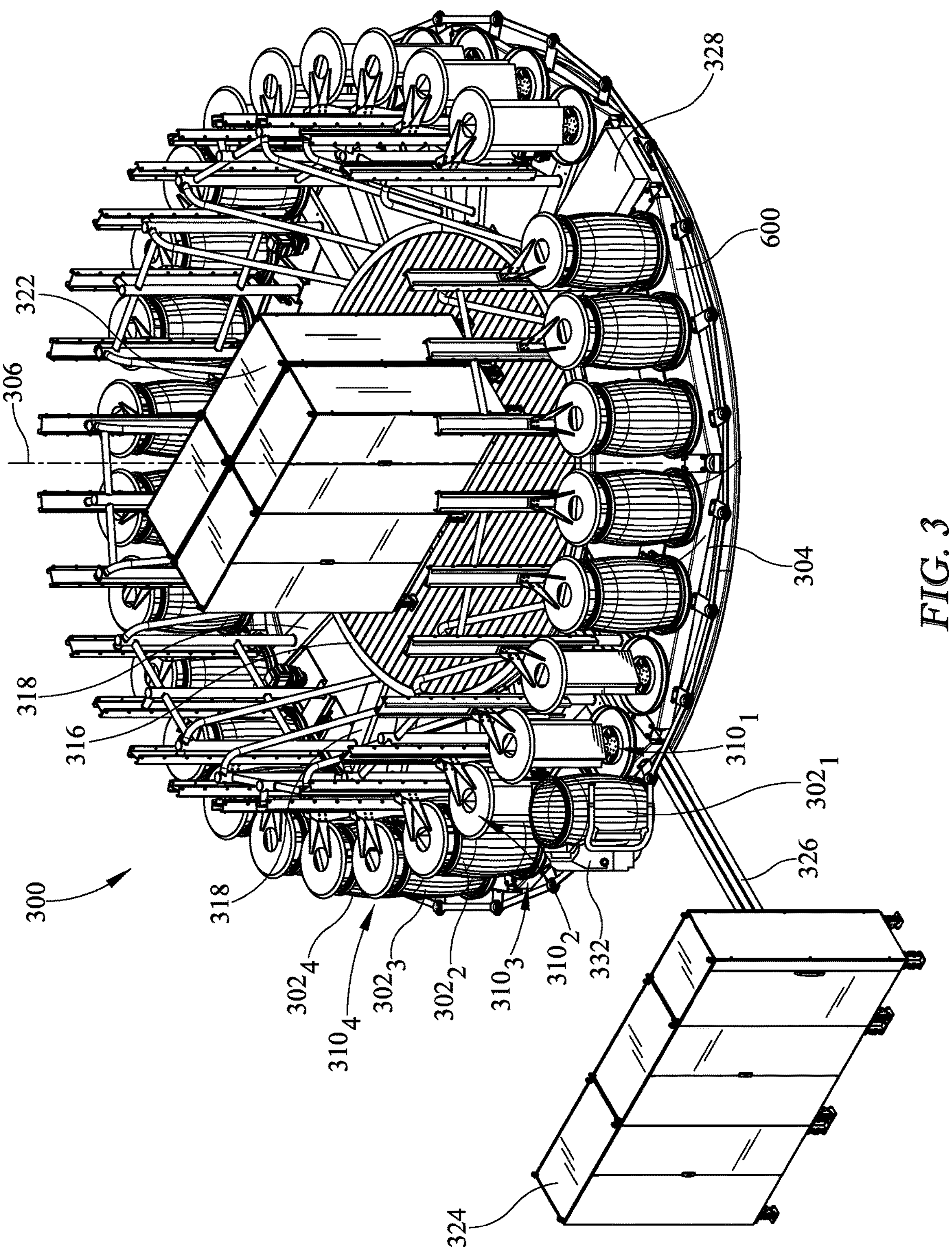
FIG. 3 illustrates a perspective view of an apparatus for toasting a plurality of wooden barrels consistent with some embodiments of the invention.
Figure 4:
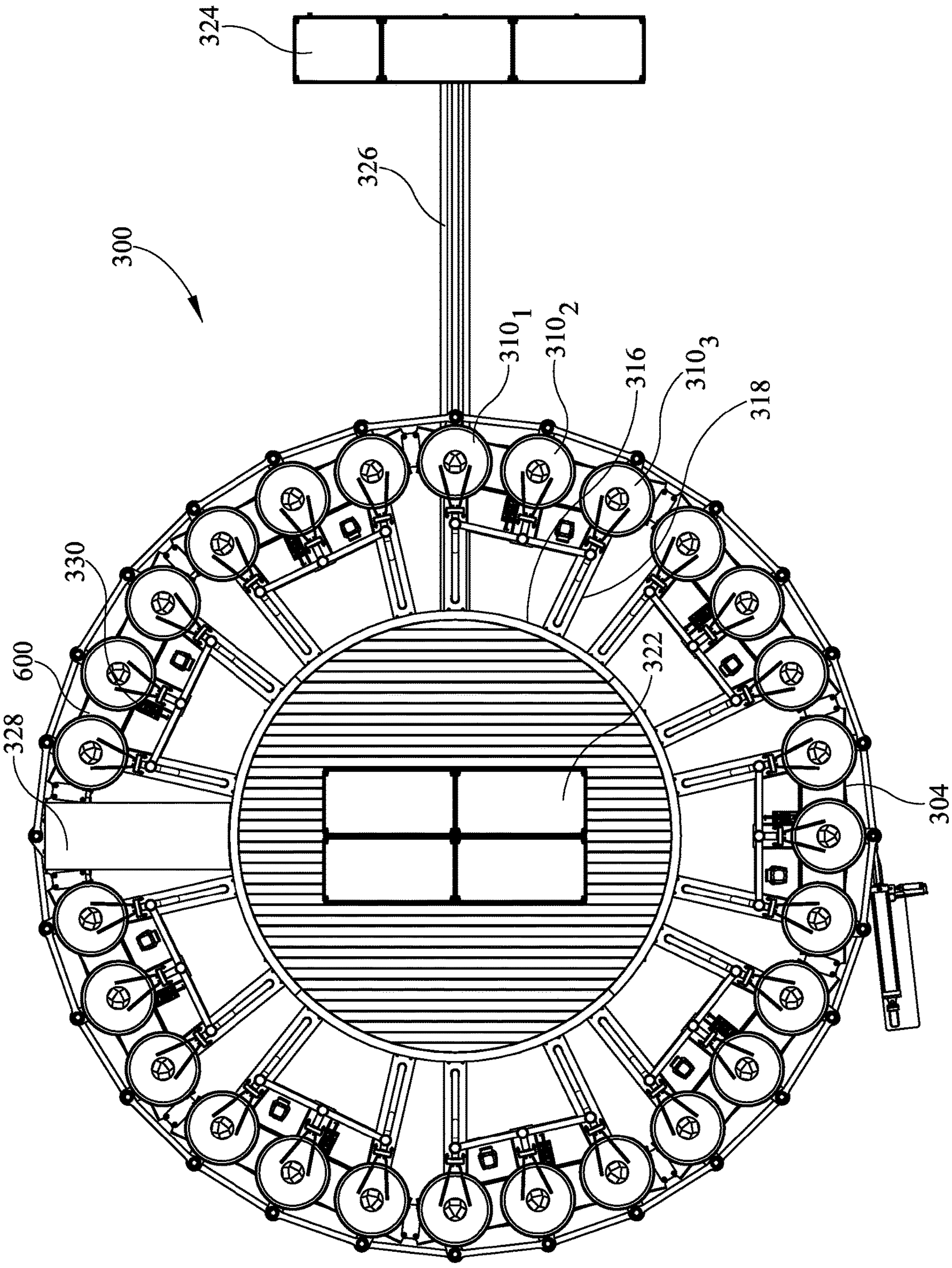
FIG. 4 illustrates a top view of the apparatus for toasting wooden barrels of FIG. 3.
Figure 5:
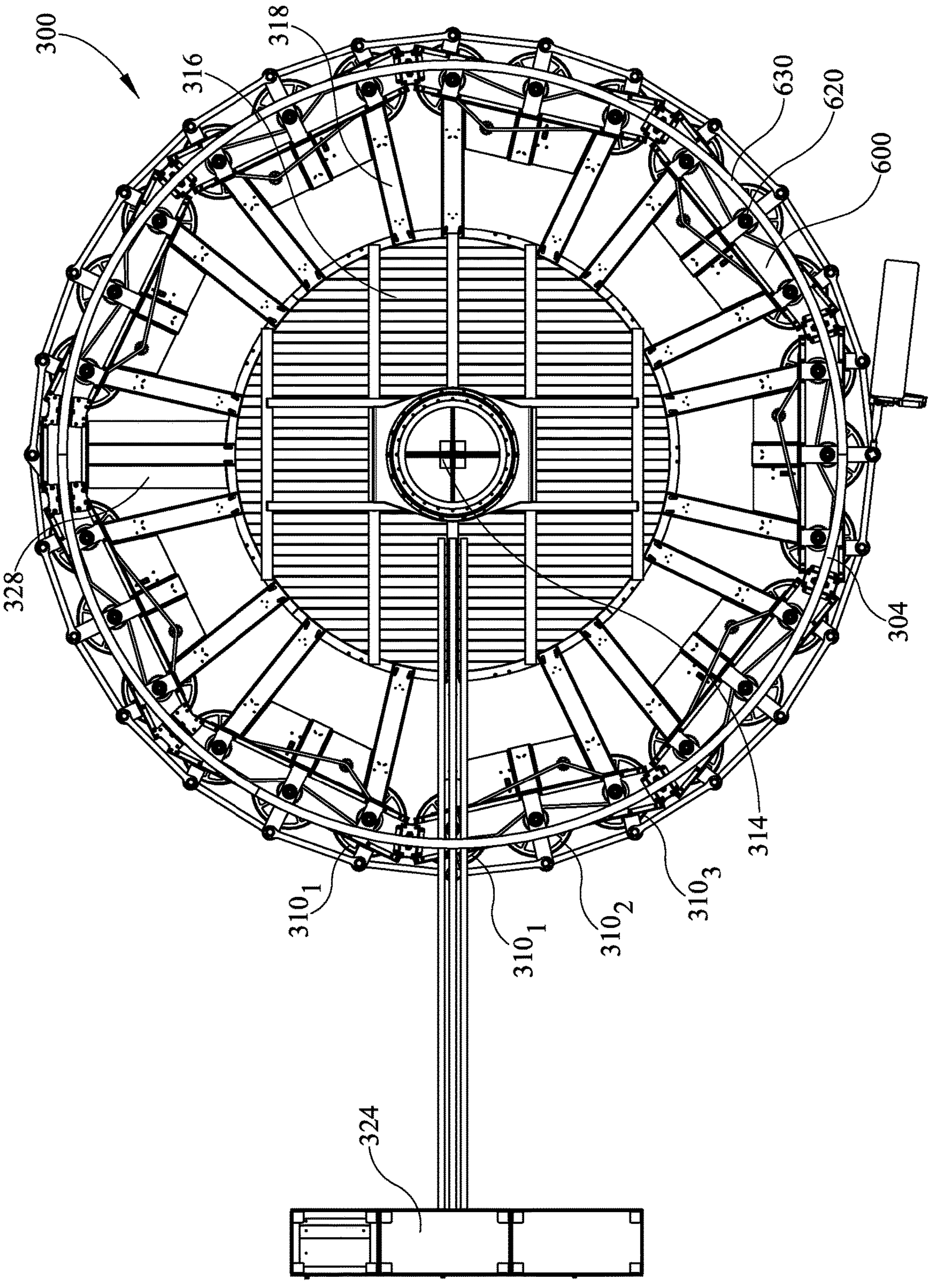
FIG. 5 illustrates a bottom view of the apparatus for toasting wooden barrels of FIG. 3.

In some instances, it may be desirable to increase throughput of the barrel toasting process by simultaneously toasting multiple barrels. This may be achieved for example, through use of multiple heating apparatuses 100, for example those described with reference to FIGS. 1A-1B and 2A-2B, arranged around a carousel, such as illustrated in FIGS. 3-5. Referring now to FIGS. 3-5, an apparatus 300 for toasting multiple wooden barrels $\mathbf{302}_{1\text{-}n}$ is illustrated. Such an apparatus 300 may generally include a carousel 304 that includes a plurality of barrel heating stations $\mathbf{310}_{1\text{-}N}$ arranged about a periphery of the carousel and about an axis rotation 306 about which the carousel 304 and barrel heating stations $\mathbf{310}_{1\text{-}N}$ rotate. The carousel 304 rotates between a plurality of rotational positions about axis of rotation 306 to position selected barrel heating stations $\mathbf{310}_{1\text{-}N}$ adjacent loading and/or unloading positions disposed about the periphery of the carousel. In some embodiments, for example, barrel loading and unloading may occur at a single barrel loading/unloading station disposed at a predetermined (and fixed) position adjacent to the carousel, whereby whenever a particular barrel heating station is disposed adjacent to the barrel loading/unloading station by virtue of rotation of the carousel, a toasted barrel may be unloaded from the barrel heating station and another (untoasted) barrel may be loaded into the barrel heating station before the carousel is rotated to a next rotational position. Alternatively, if barrel loading and unloading occur at separate loading and unloading stations disposed at different fixed positions adjacent to the carousel, whenever the carousel is in a predetermined rotational position, one barrel heating station will generally be disposed adjacent the loading station while another barrel heating station is disposed adjacent the unloading station such that loading of a new (untoasted) barrel into the former barrel heating station and unloading of a toasted barrel from the latter barrel heating station may occur concurrently using the loading and unloading stations and prior to rotating the carousel to a next rotational position.

In some instances, each of the barrel heating stations 310$_{1-n}$ may be implemented as a heating apparatus 100 consistent with some of the embodiments described herein with respect to FIGS. 1A-1B and 2A-2B. As such, each barrel heating station 310$_{1-n}$ may include a rotatable barrel support 105 and an infrared heater 120, which is capable of heating an inner surface of a wooden barrel when supported by the respective barrel support. In other embodiments, however, other types of heating apparatuses may be used as barrel heating stations on carousel 304, so the invention is not limited to the use of the heating apparatus 100 of FIGS. 1A-1B and 2A-2B on carousel 304.

When the carousel 304 is in a first rotational position (e.g., the rotational position illustrated in FIGS. 3-5), a first barrel heating station 310$_1$ may be positioned to have a first barrel 302$_1$ loaded onto it. The carousel 304 may be rotated around the axis of rotation 306 from this first rotational position to a second rotational position where the first barrel heating station 310$_1$ is positioned to have first barrel 302$_1$ unloaded therefrom. As the carousel 304 rotates from the first rotational position to the second rotational position, the infrared heater of the first barrel heating station 310$_1$ may be lowered into the first barrel to toast the first barrel 302$_1$, and then raised out of the first barrel prior to unloading once toasting is complete. In the embodiment illustrated in FIGS. 3-5 the rotation is counter-clockwise, such that the barrel may be toasted while it almost completes a full revolution around the carousel. However, this is not intended to be limiting as in other embodiments the rotation may be clock-wise. Once arriving at the second rotational position the first barrel heating station 310$_1$ is positioned to have the first barrel 302$_1$ unloaded therefrom. The loading and/or unloading may be achieved through use of an automated system (e.g. a loading/unloading clamp, robotic arm, or the like) or may be done manually. The degree measurements of the first and second rotational positions of the carousel 304 are merely exemplary and not intended to be limiting, the positions may vary based on the number of barrel heating stations and/or gangways around the carousel, the spacing of the stations and/or gangways, and the like. For example, in the embodiment of FIGS. 3-5, 27 barrel heating stations and one gangway are disposed around the carousel, and each of roughly equal width, resulting in each barrel heating station and the gangway being separated by 360/28 or 12.86 degrees of revolution of the carousel, and thus, carousel being rotated about 12.86 degrees when transitioning to a next rotational position. Furthermore, in some instances, the first rotational position and the second rotational position may be the same rotational position, such that the first barrel 302$_1$ is loaded on and unloaded from the same rotational positon of the carousel 304. In such instances, the barrel loading and unloading may be performed at a barrel loading/unloading device 332 adjacent the carousel 304, and each barrel therefore rotates a full 360 degrees around the axis of rotation of the carousel. In other instances, it may be desirable to have the first rotational position and the second rotational position be different positions, such that the first barrel 302$_1$ is loaded at a first rotational position and unloaded from a different rotational positon of the carousel 304. In such instances, the barrel loading and unloading may be performed by a separate barrel loading station and barrel unloading station, respectively adjacent the carousel 304. For example, in some embodiments, it may be desirable to position the barrel loading and unloading stations adjacent one another to enable one barrel to be loaded onto one barrel heating station while unloading another barrel from an adjacent barrel heating station, and in such instances each barrel would travel less than a full revolution around the axis of rotation. With the embodiment of FIGS. 3-5 having 27 barrel heating station and a gangway, each barrel would therefore travel 360-12.86 or about 347.14 degrees about the axis of rotation.

The carousel 304 may, in some instances, additionally include a drive 314, for example a motor, gear, or the like, that may be used to facilitate the rotation of the carousel 304 about the axis of rotation 306. This drive 314 may be configured to pause the carousel 304 at each of the positions for a predetermined length of time. For example, if the desired total toast time for a barrel is 12 minutes and there are a total of 24 positions around the carousel 304 where heating is to occur, the barrel would need to spend approximately 30 seconds at each position where heating is to occur. In other instances, the drive 314 may be configured to allow for continuous rotation about the axis of rotation 306. In such instances, the speed of the rotation may be calculated based on the number of positions around the carousel 304 where heating is to occur in order to achieve a desired toasting time.

As the carousel rotates, additional barrels 302 may be added to the carousel 304. For example, as the carousel rotates to a second position, a second barrel heating station 310$_2$ may be positioned to have a second barrel 302$_2$ loaded thereon; as the carousel rotates to a third position, a third barrel heating station 310$_3$ may be positioned to have s second barrel 302$_3$ loaded thereon; and so on until all of the barrel heating stations 310 are in use (either toasting a barrel, or having a barrel loaded/unloaded), as illustrated in FIG. 3.

In some instances, the carousel 304 may additionally include a central hub 316 that supports at least a portion of the carousel 304 as it rotates about the axis of rotation 306. The central hub 316 may additionally include one or more spokes 318$_{1-n}$ to increase the level of support provided to the carousel 304. In some instances, there may be a spoke 318 corresponding to each barrel heating station 310; while in other instances there may only be a spoke 318 for every so many barrel heating stations 310. The carousel 304 may also include an internal platform 320 positioned in a center area circumscribed by the plurality of barrel heating stations 310$_{1-n}$. This internal platform 320, which may be constructed of wood, metal, or any other suitable material, may also rotate with the carousel 304, with such rotation driven by the drive 314. A central control panel 322 for powering each of the barrel heating stations 310$_{1-n}$ may also be positioned on the rotating central platform.

In some instances, the central control panel 322 may be connected to a fixed main control panel 324 located separate from the carousel such that the main control panel is at a fixed location and does not rotate about the axis of rotation. In some instances, the main control panel 324 may be located adjacent the carousel, but this is not intended to be limiting as the main control panel may, in some instances, be located in an adjacent room, facility, or the like from the central control panel 322. Regardless of the distance between the main control panel 324 and the central control panel, there may be a connection 326 between them to convey electrical power and/or information between the main control panel and the central control panel. In some instances, the connection 326 may be implemented using one or more slip rings, which allow the transmission of power and electrical signals from a stationary structure (e.g. the main control panel 324) to a rotating structure (e.g. the central control panel 322). The connection 326 may run underneath (or alternatively, above) the rotating carousel 304. In other embodiments, a single control panel may be used, which may or may not be disposed on the carousel.

Given the role of the central control panel 322 in providing electrical energy to the toasting process, it may be, in some instances, desirable to have an easy way for an individual, for example a technician, to access the internal platform 320 and central control panel 322. As such, in some instances, the carousel 304 may additionally include a gangway 328 between two barrel heating stations 310 of the carousel 304 to allow easy access to the internal platform 320 and central control panel 322.

In addition to the rotation of carousel 304 from the first rotational position to a second rotational position, each of the barrel supports (see 105 in FIGS. 1A-1B and 2A-B) of each of the barrel heating stations $\mathbf{310}_{1\text{-}n}$ may also rotate, so as to rotate the barrel 302 sat thereon for even toasting. As described with reference to FIGS. 1A-1B and 2A-2B, the rotation of the barrel support of the barrel heating stations 310 may be facilitated by a single drive for a single barrel heating station 310. However, in other instances, a single drive 330 may facilitate the rotation of multiple barrel heating stations 310, for example each of the barrel heating stations 310 of a barrel trolley 600. For example, as illustrated best in FIG. 5, the drive 330 facilitates the rotation of each barrel support of each the heating station 310. In some embodiments, such as illustrated in FIGS. 3-5, the drive 330 may be a single motor coupled via a belt through pulleys disposed on the motor and on each of the barrel supports. The carousel 304 may include multiple barrel trolleys 600, which in some instances, may be identical to one another.

Figure 6B:
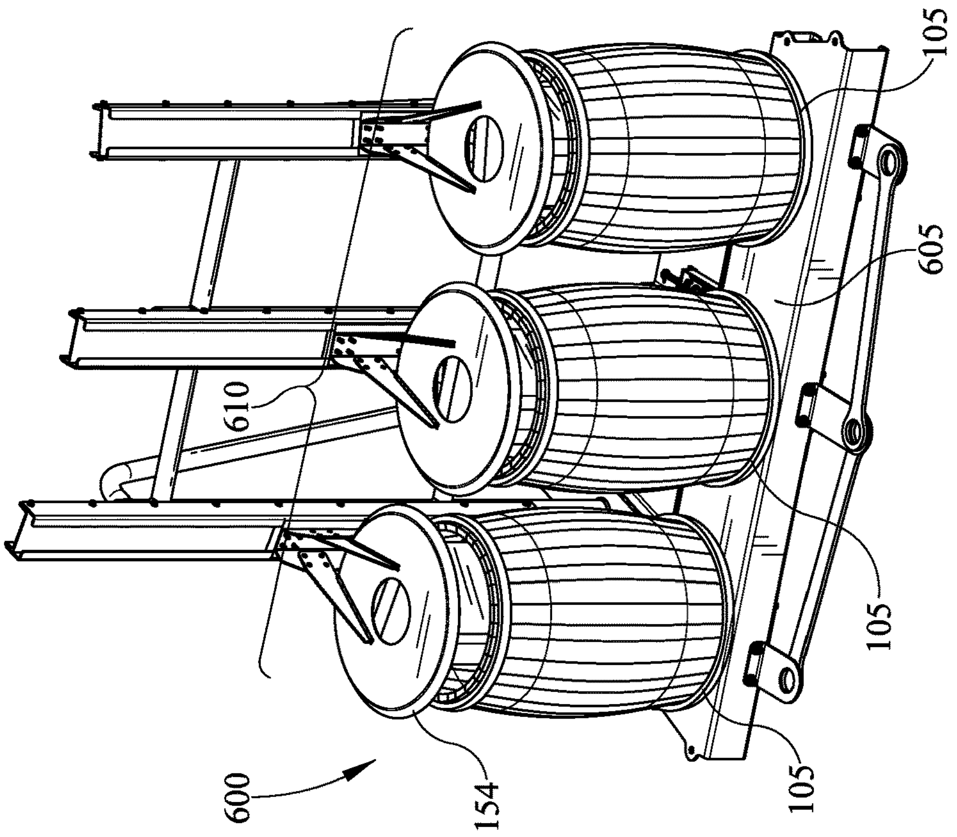
FIGS. 6A-B illustrate a perspective view of a barrel trolley consistent with some embodiments of the invention.
Figure 6A:
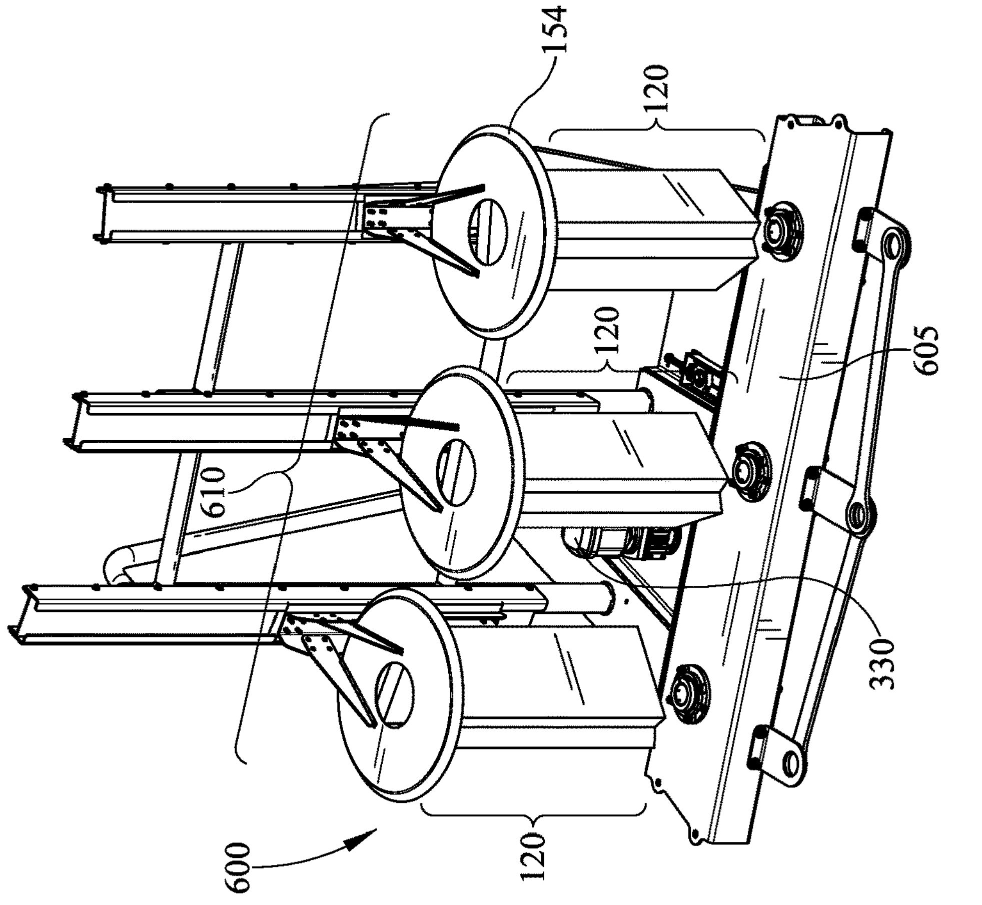

Referring now to FIGS. 6A-6B, these figures illustrate an exemplary barrel trolley 600 from FIGS. 3-5. The barrel trolley 600, may include a platform 605 or surface for supporting a set 610 of multiple of heating stations $\mathbf{310}_{1\text{-}3}$ that may collectively rotate around the axis of rotation 306. Although illustrated herein as including three barrel heating stations $\mathbf{310}_{1\text{-}3}$, this is not intended to be limiting. In some instances, it may be desirable for the set of multiple heating stations to include only two barrel heating stations; in other instances, it may be desirable for the set of multiple heating stations to include four or more barrel heating stations. Each barrel trolley may have a drive 330, as described previously that couples with the set 610 of heating stations for rotating each of the respective barrel supports 105 (and thus barrels) during heating. This rotation allows the barrel to rotate around the infrared heater (see 120 in FIGS. 1A-1B and 2A-2B) that is at least partially disposed therein, which facilitates achieving an even toast, and rotation may occur, for example at a rate of about 2 to about 10 RPM in some embodiments. Each barrel trolley 600 may additionally include wheels 620 (illustrated in FIG. 5) that support the trolley 600 and the set 610 of heating stations hereon. These wheels 620 may allow for the barrel trolley 600 to rotate along with the carousel 304. In some instances, this rotation along with the carousel 304 may be achieved through the use of a fixed track 630, guide, rail, or the like disposed underneath the carousel 304 (illustrated in FIG. 5) that is configured to receive the wheels 620 and allow the wheels 620 to roll along the fixed track 630, guide, rail, or the like as the carousel 304 rotates. In some instances, each barrel trolley 600 may additionally include an overhead frame 640 configured to support and stabilize each of the respective heater supports 128 of each heating station 310 on the barrel trolley 600. This overhead frame 640 may be constructed of any material of suitable strength and durability to stabilize the respective heater supports 128 as the rotate along the carousel 304.

Returning to FIGS. 3-5, multiple barrel trolleys 600 may be used along the carousel 304. For example, as illustrated in FIGS. 3-5, there may be nine barrel trolleys 600, supporting twenty-seven (27) heating stations arranged circularly around the carousel 304. However, this is not intended to be limiting, as the number and arrangement of the barrel trolleys 600 and heating stations 310 thereon may vary based on any number of factors recognizable to a person of skill in the art, including but not limited to, the throughput need, physical space restrictions, power restrictions, etc.

In some instances, various sensors may be placed around the apparatus to detect various conditions important to toasting. For example, an environmental sensor may be placed into the barrel (e.g. along with the infrared heater) in order to detect the temperature, humidity, etc. of the inside of the barrel. Other environmental sensors may be placed throughout the toasting facility to detect the temperature, humidity, etc. of the conditions external to the barrels. In some instances, the measurements collected from these sensors may allow a cooper to change various settings (the temperature settings of the infrared heater or the time of toasting) of the apparatus to improve the toasting process.

Figure 7:
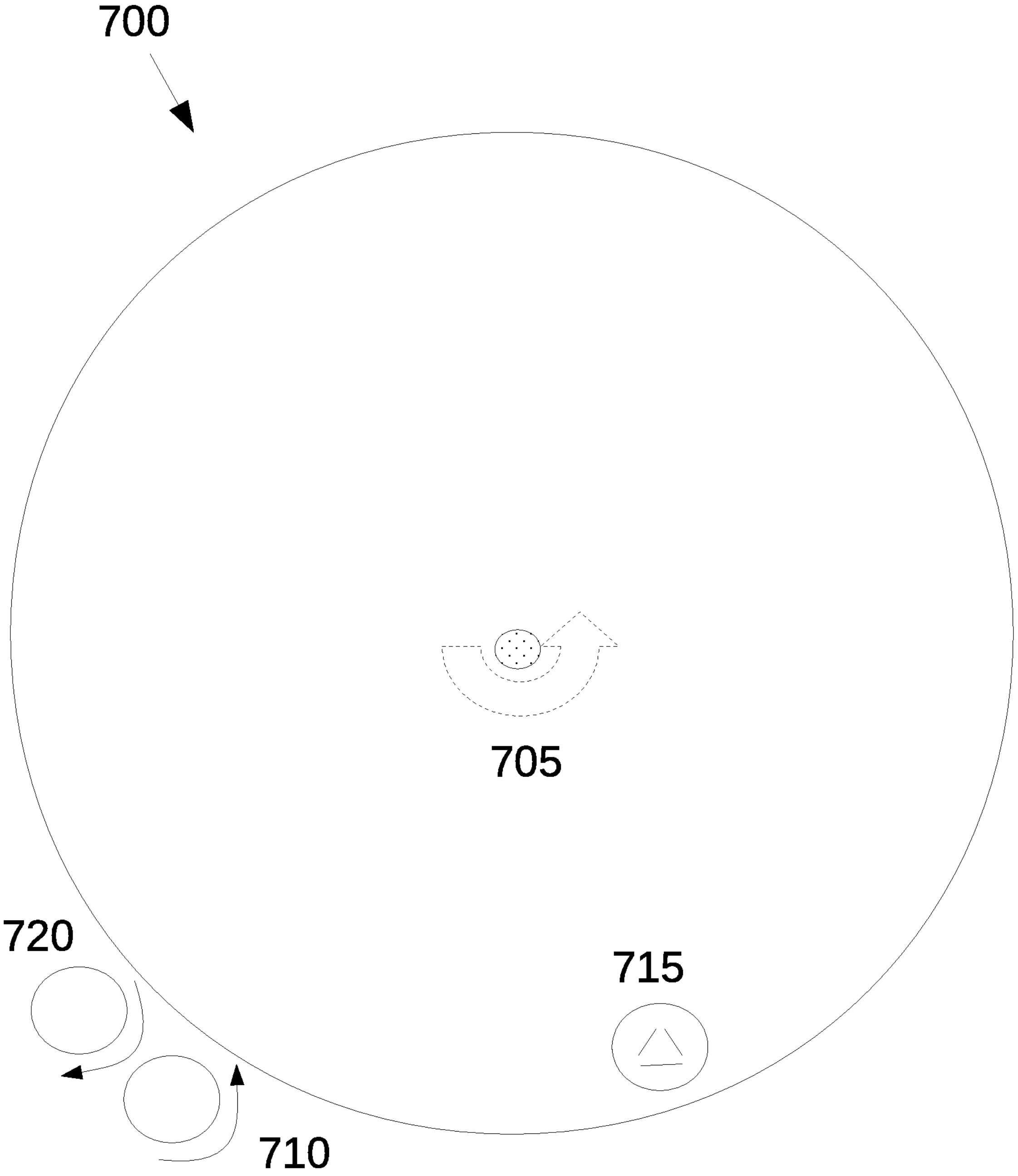
FIG. 7 is a top-view of a schematic illustrating a process for toasting a wooden barrel consistent with some embodiments of the invention.

Turning now to FIG. 7, a top view schematic of a method 700 of toasting a wooden barrel is illustrated. At 705, the carousel, represented by the large circle, rotates about an axis of rotation represented by the small patterned circle. At 710, a barrel is loaded onto a first barrel heating station at a first rotational position of the carousel. At 715, an infrared heater disposed at least partially within the barrel, toasts the interior of the barrel. At 720, the toasted barrel is unloaded at a second rotational position on the carousel, and it will be appreciated that in this embodiment separate loading and unloading stations, which are at adjacent positions relative to one another, are used to load and unload barrels onto and off of the carousel. It is to be understood that FIG. 7 is merely a simplistic schematic, and that numerous variations, including all of those described herein, may be implemented into this method. For example, it will be appreciated that loading and unloading of barrels may occur at the same fixed position adjacent the carousel, at adjacent fixed positions adjacent the carousel, or even non-adjacent fixed positions adjacent the carousel. Loading and unloading may occur through the use of robotic arms or other conveying mechanisms, or in some instances manually. Movement of an infrared heater from the storage position to the heating position may occur at the same rotational position of the carousel at which a barrel is loaded onto the carousel, or may occur after some rotation of the carousel. Similarly, movement of an infrared heater from the heating position to the storage position may occur at the same rotational position of the carousel at which a barrel is removed from the carousel, or may occur at an earlier rotation of the carousel.

Figure 8:
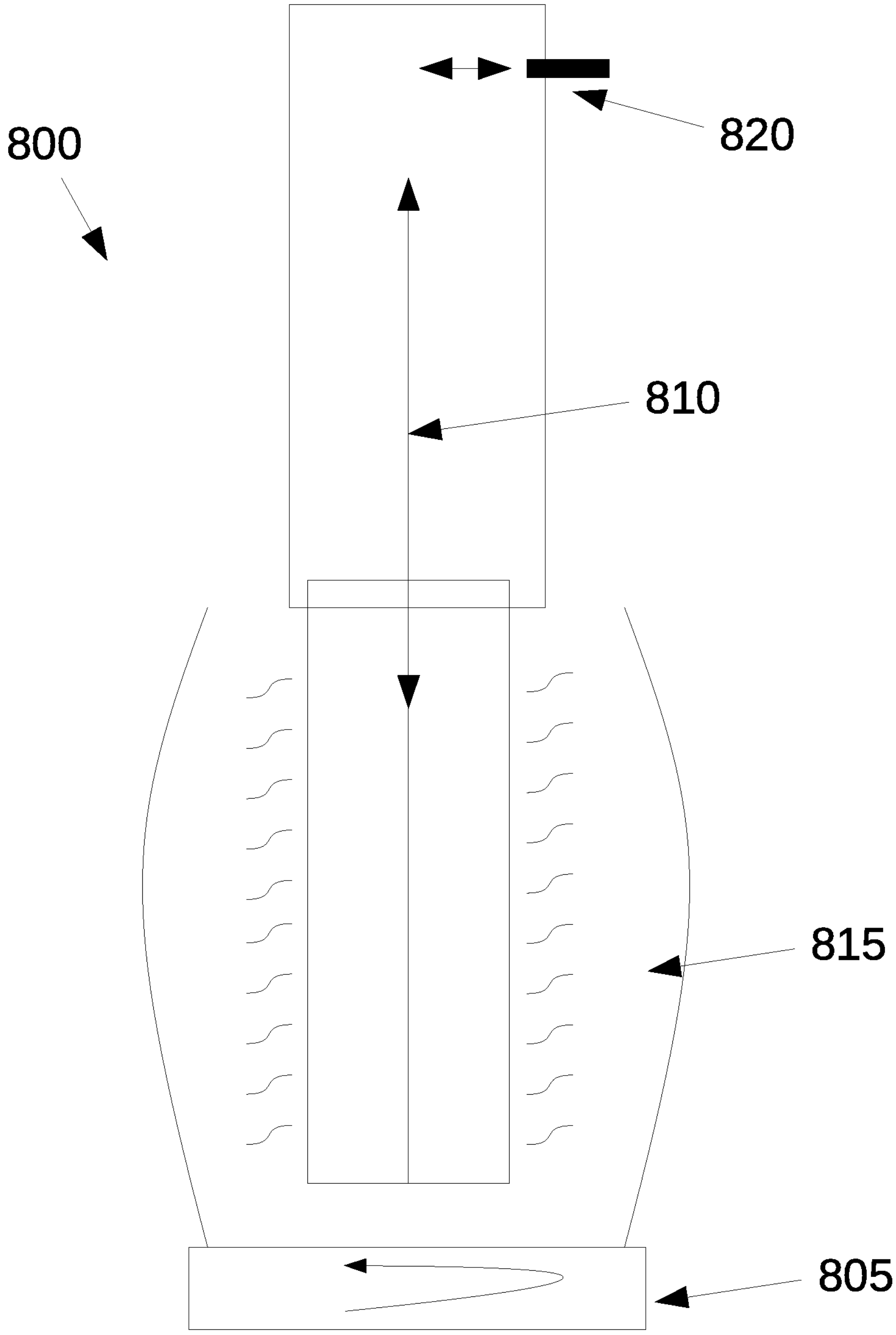
FIG. 8 is a side-view of a schematic illustrating another process for toasting a wooden barrel consistent with some embodiments of the invention.

Turning now to FIG. 8, a front view schematic of another method 800 of toasting a wooden barrel is illustrated. At 805, a wooden barrel is supported on a rotatable barrel support. At 810, an infrared heater is moved from a first, storage position where it is external to the wooden barrel to a second, heating, position where at least a portion of the heater is disposed within the wooden barrel. Once in a heating position, at 815, the infrared heater heats the inner surface of the wooden barrel while the barrel support, and thus barrel, rotate around the infrared heater. In some instances, the method 800 may additionally include, at 820, actuating a locking pin in order to release the infrared heater from the first, storage, position, prior to moving the infrared heater from the storage position to the heating position.

Various additional modifications may be made to the illustrated embodiments consistent with the invention. Therefore, the invention lies in the claims hereinafter appended.

What is claimed is:

1. A heating apparatus for toasting a wooden barrel, comprising:

a barrel support to support the wooden barrel;

a drive for rotating the barrel support;

an infrared heater including a plurality of infrared heating elements; and a heater support configured to move the infrared heater between a first position and a second position, wherein in the first position the infrared heater is external to the wooden barrel, and in the second position at least a portion of the infrared heater is positioned within the wooden barrel to heat an inner surface of the wooden barrel, and wherein rotation of the barrel support by the drive when the infrared heater is in the second position rotates the wooden barrel about the infrared heater, wherein the infrared heater is of a substantially triangular prism shape.

2. The heating apparatus of claim 1, wherein the plurality of infrared heating elements includes a first heating element, a second heating element, and a third heating element, each of which form a first side, a second side, and a third side respectively of a substantially triangular prism shape.

3. The heating apparatus of claim 2, wherein the substantially triangular prism shape includes an open top and an open bottom for internal ventilation.

4. The heating apparatus of claim 2, wherein the heater support further includes a cover sized and configured to cover an open end of the wooden barrel when the infrared heater is in the second position, wherein the cover further includes an opening to release heat.

5. The heating apparatus of claim 1, wherein the heating apparatus is a first heating apparatus of a plurality of heating apparatuses, wherein the plurality of heating apparatuses are arranged around a carousel.

6. The heating apparatus of claim 1, wherein the heating apparatus is a first heating apparatus of a plurality of heating apparatuses, wherein the first heating apparatus, a second heating apparatus, and a third heating apparatus of the plurality of heating apparatuses are arranged on a barrel trolley.

7. The heating apparatus of claim 1, wherein the barrel support supports the wooden barrel in an upright position, the wooden barrel having an open top; and wherein the heater support moves the infrared heater vertically and linearly such that in the first position the infrared heater is located above the barrel and movement of the infrared heater from the first position to the second position projects the infrared heater through the open top of the wooden barrel.

8. The heating apparatus of claim 7, wherein the heater support includes a solenoid-actuated locking pin to hold the infrared heater in the first position.

9. An apparatus for toasting a plurality of wooden barrels, comprising:

a carousel rotatable about an axis of rotation between a plurality of positions and including a plurality of barrel heating stations arranged about the axis of rotation, each barrel heating station including a barrel support and an infrared heater configured to heat an inner surface of a wooden barrel supported by the respective barrel support;

wherein when in a first position of the plurality of positions of the carousel, a first barrel heating station among the plurality of barrel heating stations is positioned to have a first barrel loaded thereon;

wherein when in a second position of the plurality of positions of the carousel, the first barrel heating station is positioned to have the first barrel removed therefrom; and wherein the first barrel is toasted by the infrared heater of the first barrel heating station as the carousel is rotated from the first position to the second position.

10. The apparatus of claim 9, wherein the first position and the second position are the same position, whereby barrel loading and unloading are performed at a barrel loading/unloading station disposed at a first fixed location adjacent the carousel.

11. The apparatus of claim 9, wherein the first position and the second position are different positions, whereby barrel loading is performed at a barrel loading station disposed at a first fixed location adjacent the carousel and barrel unloading is performed at a barrel unloading station disposed at a second fixed location adjacent the carousel.

12. The apparatus of claim 9, further comprising a carousel drive configured to rotate the carousel about the axis of rotation, wherein the carousel drive is configured to pause rotation of the carousel for a predefined period of time at each of the plurality of positions.

13. The apparatus of claim 9, further comprising a carousel drive configured to continuously rotate the carousel about the axis of rotation from the first position to the second position.

14. The apparatus of claim 9, wherein when the carousel is in the second position, a second barrel heating station among the plurality of barrel heating stations is positioned to have a second barrel loaded thereon.

15. The apparatus of claim 9, wherein the carousel further includes a gangway disposed between a pair of barrel heating stations among the plurality of barrel heating stations.

16. The apparatus of claim 9, wherein the carousel further comprises:

a central hub configured to rotatably support at least a portion of the carousel to facilitate rotation of the carousel about the axis of rotation;

an internal platform positioned in a center area circumscribed by the plurality of barrel heating stations, wherein the internal platform rotates with the carousel; and a central control panel positioned on the rotating platform for powering the plurality of barrel heating stations.

17. The apparatus of claim 16, further comprising a main control panel positioned at a fixed location adjacent the carousel, wherein the central hub includes a plurality of slip rings configured to convey electrical power from the main control panel to the central control panel.

18. The apparatus of claim 16, wherein the carousel further includes a plurality of barrel trolleys, each of which includes:

a respective set of heating stations among the plurality of barrel heating stations;

a drive mechanically coupled to the respective set of heating stations for rotating the respective barrel supports thereof during heating with the respective infrared heaters; and a plurality of wheels configured to support the respective set of heating stations.

19. The apparatus of claim 18, further comprising a fixed track disposed underneath the carousel, wherein the plurality of wheels of each barrel trolley are configured to roll along the fixed track during rotation of the carousel.

20. The apparatus of claim 18, wherein each of the plurality of barrel trolleys further includes an overhead frame to support a respective heater support for the respective infrared heater of each heating station among the respective set of heating stations, wherein each respective heater support is configured to move the respective infrared heater between a first position and a second position, wherein in the first position the respective infrared heater is external to a respective wooden barrel supported by the respective heating station, and in the second position at least a portion of the respective infrared heater is positioned within the respective wooden barrel to heat an inner surface of the respective wooden barrel.

* * * * *